United States Patent [19]

Knabel et al.

[11] Patent Number: 5,044,575
[45] Date of Patent: Sep. 3, 1991

[54] BELT RETRACTOR APPARATUS FOR A SEAT BELT SYSTEM COMPRISING A BELT RETRACTOR

[75] Inventors: Walter Knabel, Murnau/Staffelsee; Josef Mayer; Walter Notar, both of Unterschleissheim; Edmund Lochbihler, Munich, all of Fed. Rep. of Germany

[73] Assignee: Autoliv-Kolb GmbH & Co., Dachau, Fed. Rep. of Germany

[21] Appl. No.: 242,910

[22] Filed: Sep. 12, 1988

[30] Foreign Application Priority Data

Sep. 16, 1987 [DE] Fed. Rep. of Germany ....... 3731143
Nov. 17, 1987 [DE] Fed. Rep. of Germany ....... 3739063
Mar. 25, 1988 [DE] Fed. Rep. of Germany ....... 3810246

[51] Int. Cl.⁵ ............................................. B65H 75/48
[52] U.S. Cl. ................................................ 242/107.2
[58] Field of Search ................... 242/107.2; 280/806, 280/807, 808, 801, 803; 297/478, 480

[56] References Cited

U.S. PATENT DOCUMENTS

| | | | |
|---|---|---|---|
| 3,504,867 | 4/1970 | Stevenson | 242/107.2 |
| 4,241,886 | 12/1980 | Maekawa | 242/107.2 |
| 4,492,348 | 1/1985 | Ziv | 242/107.2 |
| 4,519,555 | 5/1985 | Tukamoto | 242/107.2 |
| 4,570,975 | 2/1986 | Kawaguchi | 242/107.2 |

FOREIGN PATENT DOCUMENTS

83306855.4 11/1986 European Pat. Off. .
3418378 2/1986 Fed. Rep. of Germany .
3539280 5/1987 Fed. Rep. of Germany ... 242/107.2

Primary Examiner—Katherine Matecki
Attorney, Agent, or Firm—Morgan & Finnegan

[57] ABSTRACT

A belt clamping apparatus is provided for a seat belt system comprising a belt retractor and a device which is controlled by at least one acceleration sensor and serves to lock gears which are connected to the reel shaft of the belt retractor. The clamping apparatus comprises a clamping wedge, which is guided on a sliding surface that is fixed to a housing to move parallel to a back-pressure plate which is fixed to the housing, and together with the clamping wedge defines a gap for the passage of the belt, and an actuating member, which is movable by the locking device and displaces the clamping wedge to its clamping position. The actuating member is rotatably connected at one end to the housing and is pivoted at its other end to the clamping wedge, when the belt is being extracted further after the gears have been blocked by the actuating member in response to the movement of the reel shaft and imparts a translational movement to the clamping wedge. A spring element is provided between the clamping wedge and a stop which is fixed to the housing. The clamping wedge consists of one arm of a two-armed lever, the other arm of which constituted a spring abutment, and the spring-loaded arm holds the clamping wedge in engagement with the sliding surface which is fixed to the housing.

16 Claims, 8 Drawing Sheets

BELT RETRACTOR APPARATUS FOR A SEAT BELT SYSTEM COMPRISING A BELT RETRACTOR

BACKGROUND OF THE INVENTION

1. Field of the Invention

This invention relates to a belt clamping apparatus for a seat belt system comprising a belt retractor and a device which is controlled by at least one acceleration sensor and serves to lock gears which are connected to the reel shaft of the belt retractor, which clamping apparatus comprises a clamping wedge, which is guided on a sliding surface that is fixed to a housing to move parallel to a back-pressure plate which is guided is fixed to the housing and together with the clamping wedge defines a gap for the passage of the belt, and an actuating member, which is movable by the locking device and displaces the clamping wedge to its clamping position.

2. Description of the Prior Art

Such a belt clamping apparatus is known from U.S. Pat. No. 4,241,886 and comprises a blocking lever, which is pivoted on a pin to an inertial disk and in case of a response of a vehicle- or belt-sensitive acceleration sensor will interlock with an internal gear of a coupling disk so that a cam which is fixed to the reel shaft tends to rotate the coupling disk by means of a blocking lever as the belt is extracted. The rotation of the coupling disk causes claws to be extended to interlock with and block the teeth of the gears of the reel. Rotation of the coupling disk will also result in the raising of the control lever which consists of a link is raised so that the clamping wedge which is guided in oblique guides is moved against the belt and the latter is thus clamped between the clamping wedge and the back-pressure plate. In the known belt clamping apparatus that end at which the link for displacing the clamping wedge is linked to the coupling disk is constrained to follow a circular path like a connecting rod so that it is not possible to move the clamping wedge at a velocity which is optimally adapted to the velocity at which the belt is being extracted.

Another disadvantage of the known apparatus resides in the fact that the clamping wedge is pivotally movable about the articulated joint connecting the wedge to the link and for this reason it must be biased by the belt so that the sliding surface of the clamping wedge will be held in engagement with the oblique sliding surface which is fixed to the housing. As a result, the belt will be moved along the clamping surface of the clamping wedge in frictional contact therewith as the belt is extracted in the usual manner without a blocking of the belt retractor.

SUMMARY OF THE INVENTION

It is an object of the invention to provide a belt clamping apparatus which is of the kind described first hereinbefore and in which the clamping wedge is guided at its rear sliding surface on the sliding surface that is fixed to the housing in such a manner that a canting of the clamping wedge will be prevented.

In a belt clamping apparatus which is of the kind described first hereinbefore that object is accomplished in accordance with the invention by providing an actuating member which is rotatably connected at one end to the housing and is pivoted at its other end to the clamping wedge, when the belt is being extracted further after the gears have been blocked by the actuating member in response to the movement of the reel shaft and imparts a translational movement to the clamping wedge. A spring element is provided between the clamping wedge and a stop which is fixed to the housing. The clamping wedge consists of one arm of a two-armed lever, the other arm of which constitutes a spring abutment, and the spring-loaded arm holds the clamping wedge in engagement with the sliding surface which is fixed to the housing.

In the belt clamping apparatus in accordance with the invention the clamping wedge at its rear sliding surface will always be guided on and supported by the oblique sliding surface which is fixed to the housing. This will prevent an unintended clamping and canting of the clamping wedge. In addition, the manner in which the clamping wedge is guided in accordance with the invention will ensure that the clamping wedge will not be required to contact the belt unless the blocking device is activated since the clamping wedge can be guided without bearing on the belt. The spring element will always hold the rear sliding surface of the clamping wedge in engagement with the sliding surface, that is fixed to the housing so that effective guidance of the clamping wedge with low friction will be ensured.

The actuating member suitably consists of two levers which are spaced apart levers which are interconnected by a crossbar, which constitutes a stop, and the underside of the clamping wedge in position of rest lies on that stop, whereas its sliding surface bears on the sliding surface that is fixed to the housing. The stop defines for the clamping wedge a predetermined zero position, in which the force of the spring element is not exerted on parts of the belt retractor, such as the sensor pawl and the impulse lever.

The two levers which are interconnected by the crossbar are suitably disposed adjacent to the ends of the underlying reel shaft which shaft may alternatively be disposed between the levers.

The component of force of the spring element has suitably the same direction as the sliding surface which is fixed to the housing.

The connection between the clamping wedge and the actuating member may be accomplished by pins provided on the clamping wedge and which extend into slots provided in the actuating member, which slots have longitudinal center lines disposed in a plane which when the apparatus is in position of rest includes an angle of about 45° with respect to the sliding surface that is fixed to the housing.

The articulated joint between the clamping wedge and the actuating member is suitably disposed in a plane which is defined by the continuation of the sliding surface that is fixed to the housing. Such design an effective engagement of the rear sliding surface of the clamping wedge with the sliding surface which is fixed to the housing even when the apparatus is in a position of rest.

The angle between the sliding surface that is fixed to the housing and the back-pressure plate is 26 to 28 degrees.

The invention is also applicable to an apparatus in which the reel shaft performs a lifting movement when extraction of the belt is continued after the gears have been blocked. In such a case it is contemplated in accordance with the invention that the pivoted actuating member comprises a camming edge on the side which faces the shaft and the camming edge engages the reel shaft as it is raised being so designed so that throughout the clamping movement the velocity of the clamping wedge in the direction in which the belt is extracted has a desired characteristic relative to the velocity at which the belt is extracted as it moves through the gap between the clamping wedge and the back-pressure plate or the velocity of the wedge is constant throughout the clamping operation. The relative velocity between the clamping surface of the clamping wedge and the belt should be selected so that wear of the belt will be minimized.

The velocity of the clamping movement of the clamping wedge may be synchronized with the velocity at which the belt is extracted or may have a different characteristic which will ensure a good clamping movement and a minimum wear of the belt.

A favorable velocity characteristic will ensure that the clamping wedge will move in synchronism with the belt being extracted until the tooth crests of its clamping surface contact the belt being extracted and the clamping wedge will subsequently be moved to its clamping position at a higher velocity.

The crossbar which constitutes the stop is suitably formed with a curved surface on that side which faces the back-pressure plate and the curved surface is centered on the center of the articulated joint between the actuating member and the housing so that the belt moving over the curved surface will be guided approximately in the same plane in all positions of the actuating member.

The invention is also applicable to an apparatus in which the reel shaft is coupled to a control member or control disk in that the gears are blocked and the reel shaft will rotate further together with the control member or control disk as the belt is extracted further. In such an apparatus it is contemplated in accordance with the invention that the actuating member be provided with a camming edge, which may be designed so that an actuating pin which bears on the camming edge and is secured to the control member or to the control disk of the blocking device will push the clamping wedge to its clamping position at a velocity which is constant relative to the velocity of the belt or is changed relative to the velocity of the belt in a desired manner during the blocking movement of the shaft. If the control member, which consists of a lever, has a selected length, the camming edge may designed so that a movement of the control member or of the control disk will impart to the clamping wedge in the direction in which the belt is extracted a relative velocity which is adapted to the velocity at which the belt is extracted and such relative velocity will be superposed on the velocity at which the clamping wedge approaches the back-pressure plate, which constitutes an abutment. The shape of the camming edge can be calculated taking into consideration the geometry existing in a given case.

In accordance with a further feature, the actuating member comprises at least one bell-crank lever and is pivoted to the housing at a fixed location in the region between its arms, one arm engaging the clamping wedge, and the other arm being formed with a cam aperture defined by a cam, the lever lengths, the angle between the lever arms and the shape of the cam being so selected that an actuating pin which bears on the cam and which is secured to a control member or a control disk of the blocking device will displace the clamping wedge to its clamping position by a clamping movement at a velocity which is constant relative to the velocity at which the belt is extracted or which is variable as desired. In such as embodiment the shape of the cam can also be selected in dependence on the existing geometry in a manner such that during an extraction of the belt the clamping wedge will move in the direction of extraction to its clamping position at a velocity which is adapted to the velocity of the belt.

In accordance with a further feature of the invention, the actuating pin is so arranged that the line described by the pin during the clamping operation will be bisected by a straight line which connects the axis of the shaft and the pivotal connection between the actuating member and the housing.

In accordance with another desirable feature, the crossbar which constitutes the stop is provided with a belt guide which is extended in the direction of the reel shaft. In such a case reliable blocking will be ensured even when the belt has unwound from the shaft because during the unwinding of approximately the last quarter revolution the belt will be displaced towards the location at which the belt is secured to the shaft and that displacement via the extended belt guide will impart to the actuating member an additional control movement which will reliably impart a clamping movement to the clamping wedge when the belt has been extracted from the shaft.

Because strong forces may be exerted on the actuating pin as the clamping wedge is activated, the actuating pin must be stable to prevent it from being sheared off. Strong forces acting on the actuating pin may also be exerted on the pawl of the vehicle-sensitive sensor and on the belt-sensitive sensor, which after a blocking will connect the reel shaft to the control disk. However, design of the pawls to provide higher stability increases the inertia of the sensor.

For the immediate foregoing reason it is a further object of the invention to reduce the forces which act on the actuating pin so that a reliable clamping movement will be ensured.

In accordance with the invention that further object is accomplished by connecting the actuating member positively and/or non-positively to the reel shaft when the belt is extracted further after the gears have been blocked.

The actuating member suitably comprises a bell-crank lever which is pivoted adjacent to its arms to the housing at a fixed location, one arm being pivoted to the clamping wedge and the other arm being provided with teeth, which mesh with a gear that is fixed to the shaft, during the clamping movement. As a result, the actuating pin is loaded only with relatively weak forces and only at the beginning of the clamping movement, and the main load is taken up by the gear on the shaft and the teeth of the control lever as soon as the gear and the teeth are in mesh.

In accordance with a particularly desirable feature of the invention a pilot lever is provided, which during the clamping movement meshes with the gear that is fixed to the shaft, and which pilot lever only operatively engages the actuating member thereafter. When a blocking is initiated by one of the sensors, the actuating pin will cause the teeth of the pilot lever to mesh with the teeth of the shaft flange virtually without exerting a load. As soon as the pilot lever is in mesh, it will engage the control lever in a manner such that the control lever will follow any further movement. All forces will be taken up by the gear on the shaft.

The pilot lever and the actuating member are suitably interconnected in a manner such that they are movable relative to each other with a deformation of the material. The pilot lever and the actuating member may be integral and preferably consist of plastic.

DETAILED DESCRIPTION OF THE PREFERRED EMBODIMENTS

Illustrative embodiments of the invention will now be explained more in detail with reference to the drawings.

Figure 1:
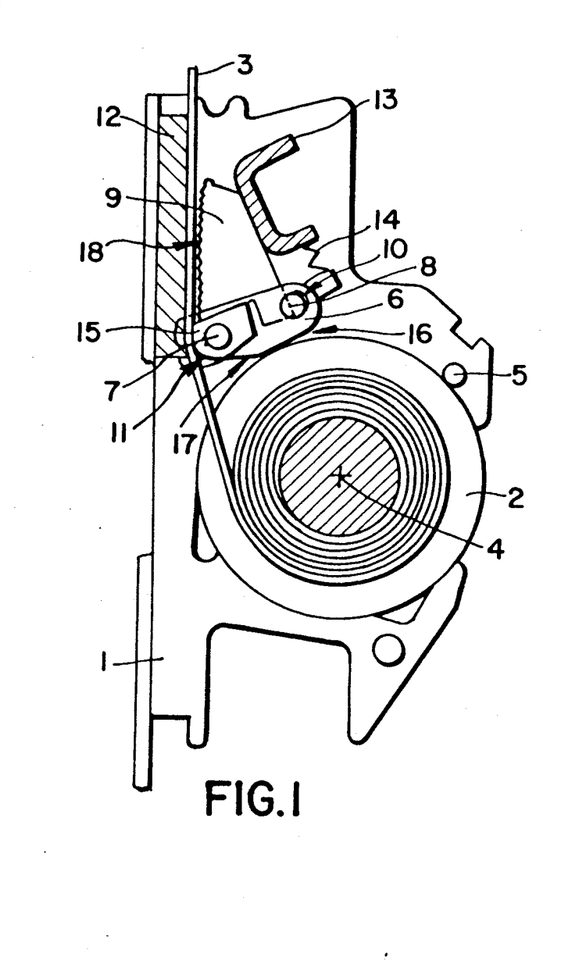
FIG. 1 is a longitudinal sectional view showing a first embodiment of the belt clamping apparatus in accordance with the invention in position of rest.

In the illustrative embodiment shown in FIG. 1 a reel shaft 2 on which the belt 3 has been coiled is rotatably mounted in a housing 1. The core 4 of the reel shaft is pivoted to the housing 1 at the point 5. The control lever 6 is also mounted in the housing for rotation on the pivot 7 and is pivoted to the clamping wedge 9 by the pivot 8. The pivot 8 is guided in the slot 10. The control lever 6 has an arcuate edge 11, which serves as a guide for the belt guiding the belt on the back-pressure plate 12. The clamping wedge 9 is guided on the channel-shaped rail 13 and is held in position of rest by the spring 14. A stop 15 restricts the movement of the clamping wedge toward the reel shaft 2 so that a gap 16 is left between the reel shaft 2 and the control lever 6.

The mode of operation of the belt clamping apparatus in accordance with the invention will now be described as follows:

Sensors, (not shown) which are either vehicle-sensitive and/or belt-sensitive, are adapted to effect a blocking of the reel 2. When extraction of the belt in the direction of arrow F is undertaken and then continued, the core 4 of the reel shaft 2 moves along a circular path about the pivot point 5 on the housing 1. After crossing the gap 16, the reel shaft 2 engages the camming edge 17 of the control lever 6. As the belt is extracted further, the camming edge 17 slides on the reel shaft 2 and the control lever 6 is pivotally raised about the pivot 7 and also urges the clamping wedge 9 upwardly against the force of the spring 14. The clamping wedge is guided by the rail 13 in such a manner that the clamping surface 18 of the wedge moves parallel to and in synchronism with the belt and progressively approaches the latter.

Figure 2:
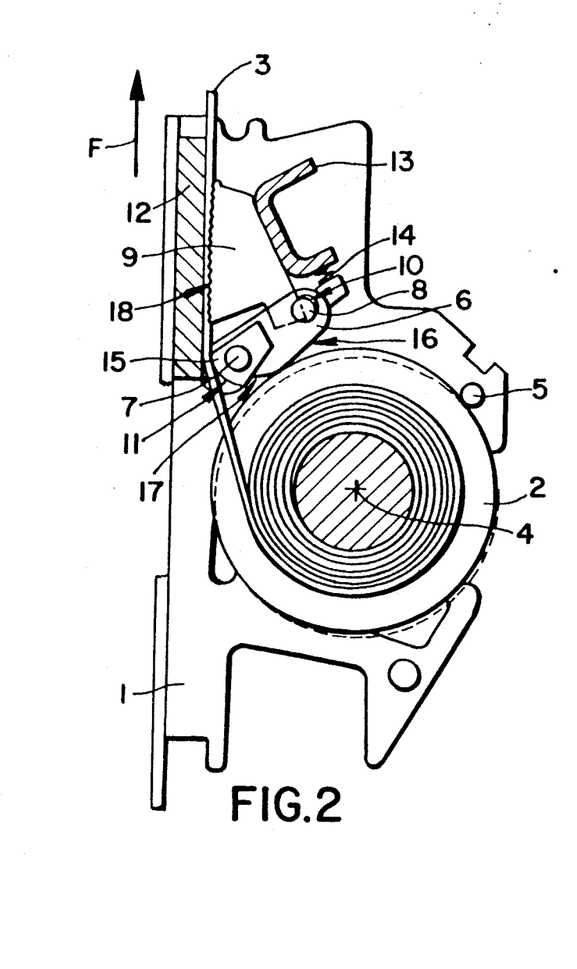
FIG. 2 shows the belt clamping apparatus of FIG. 1 in a position in which the teeth on the clamping surface of the clamping wedge just begin to engage the belt.

In the position shown in FIG. 2 the teeth of the clamping surface 18 have just begun to bite into the belt 2. As the exertion of force on the belt in the direction of the arrow F is continued, the clamping wedge 9 is forced to its end position and the extraction of the belt is entirely blocked. In consideration of the angle between the guide 13 and the back-pressure plate 12, the force of the spring 14 is selected so that when the extraction of the belt has been blocked the wedge 9 will not be forced back to its position of rest unless such a strong belt extracting force has been exerted after a crash that damage to the clamping apparatus or to the belt results. In such a case, the seat belt system will have to be replaced.

Figure 3:
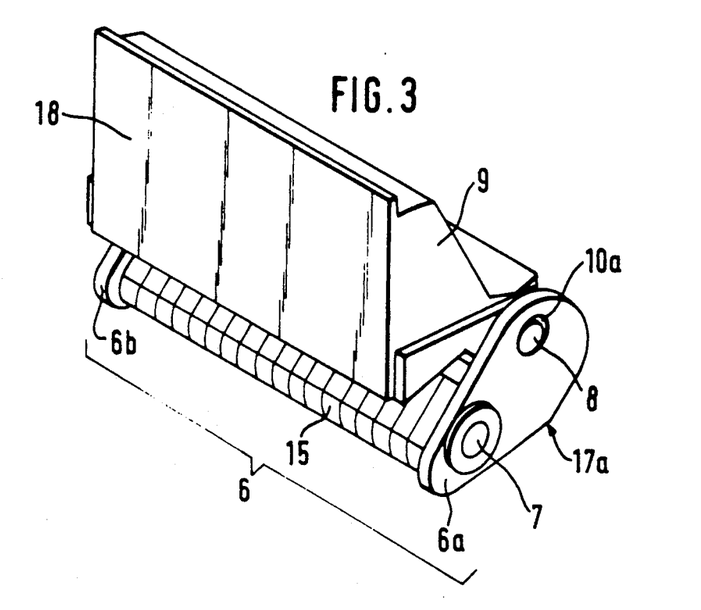
FIG. 3 is a perspective view showing the clamping wedge and the control lever which is connected thereto.

The articulated joint which is constituted by the clamping wedge and the control lever is shown in detail in FIG. 3. The control lever 6 consists of two side members 6a and 6b, which are provided with respective camming edges 17a and 17b (not shown). The pivot 7 extends through the stop 15, by which the two side members are fixedly interconnected. The pivot 8 is fitted in a guide of the clamping wedge 9 and extends through slots 10a and 10b (not shown) in the side members 6a and 6b of the control lever.

Figure 4:
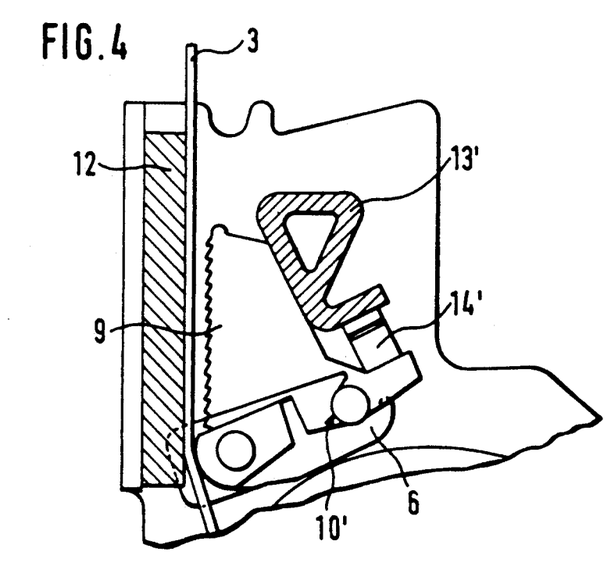
FIG. 4 is a longitudinal sectional view showing a second embodiment of the clamping apparatus in accordance with the invention.

A further illustrative embodiment of the invention is shown in FIG. 4. In this embodiment the sliding surface for the clamping wedge 9 is constituted by a hollow section 13'. The coil spring 14 in FIGS. 1 and 2 is replaced by a leaf spring 14'. The slot 10 consists of an open guide 10' in order to facilitate assembly.

Figure 5:
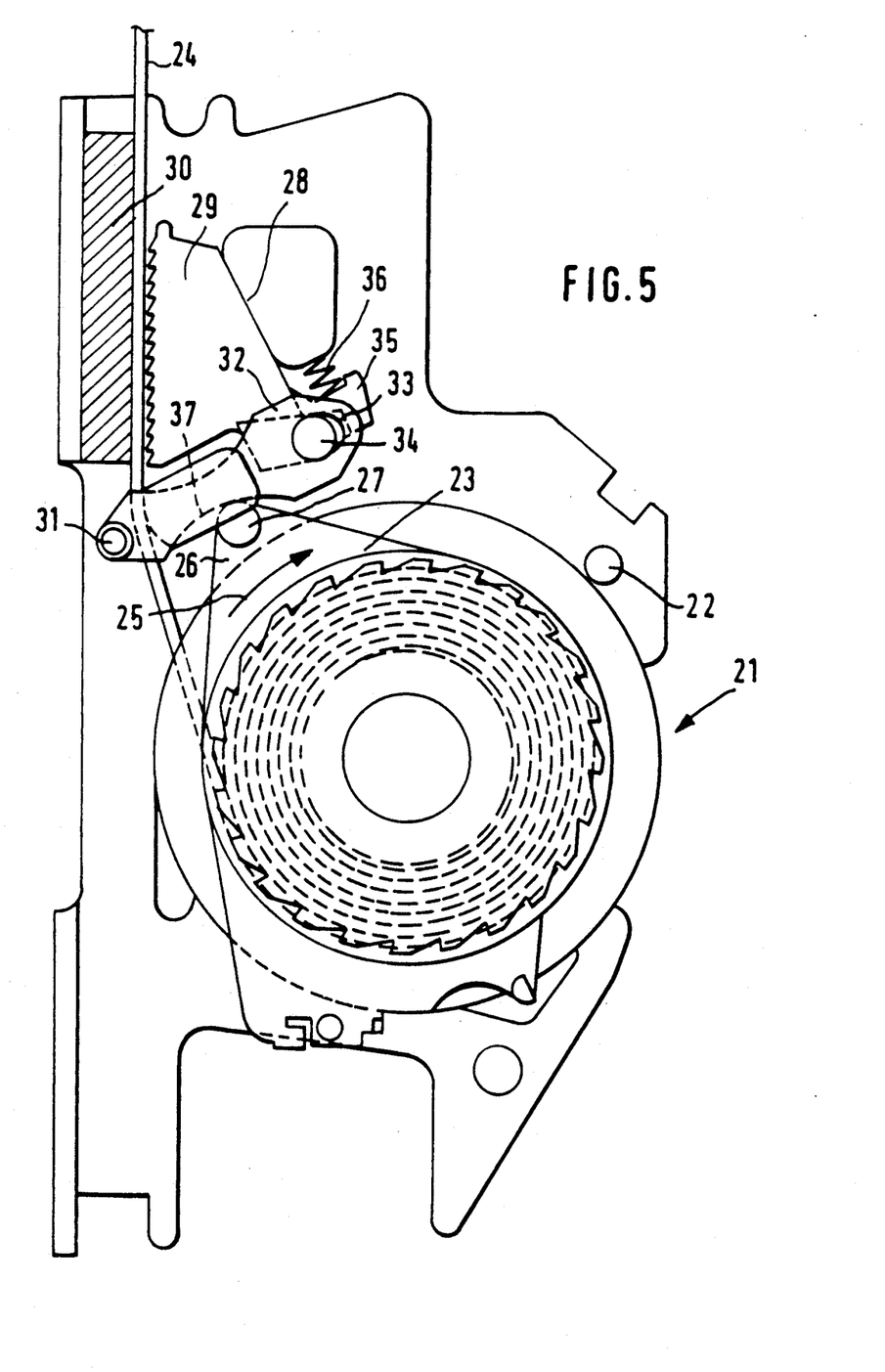
FIG. 5 is a longitudinal sectional view showing a third embodiment of the belt clamping apparatus in accordance with the invention. In this embodiment the control lever for moving the clamping wedge to its clamping position has a camming edge for actuating the lever.

Just as with the belt clamping apparatus described with reference to FIGS. 1 to 4, the illustrative embodiment shown in FIG. 5 is combined with a belt retractor of the kind described in Published German Application 34 18 378, in regards to the details of the belt retractor. The belt retractor 21 is provided with a control disk 23, which is pivoted to the housing at 22 and to which the reel shaft is coupled by a coupling wheel when an acceleration sensor has been activated. As a result, an extraction of the belt 24 will impart to the control disk 23 a pivotal movement in the direction of the arrow 25.

The control disk 23 is provided with a luglike extension 26, which carries an actuating pin 27.

An oblique guide 28 for the clamping wedge 29 is provided above the belt retractor 21. The clamping surface of the clamping wedge 29 is provided with teeth or flutes and together with the back-pressure plate 30 defines a gap as a passage for the belt 24.

A control lever 32 is pivoted to the housing on the pivot 31, which is disposed below the clamping wedge 29. The control lever 32 is provided at its free end with a slot 33, which receives a pin 34 that is connected to the clamping wedge 29. The clamping wedge 29 is provided with an abutment 35. A compression spring 36 is compressed between that abutment 35 and the oblique guide 28 and holds the clamping wedge 29 clear of the belt 24 when the acceleration sensors are not activated.

The control lever 32 is provided on its underside with a camming edge 37, which bears on the actuating pin 27 as shown and which is so designed so that when the response of the acceleration sensor has caused the reel shaft to be coupled to the control disk 23 and the belt being extracted imparts to the control disk 23 a pivotal movement about the point 22 the clamping wedge 29 will be moved to its clamping position in the direction in which the belt 24 is being extracted and that movement of the clamping wedge will be preformed at the velocity of the belt or at a different velocity, which is adapted to the velocity of the belt.

Figure 6:
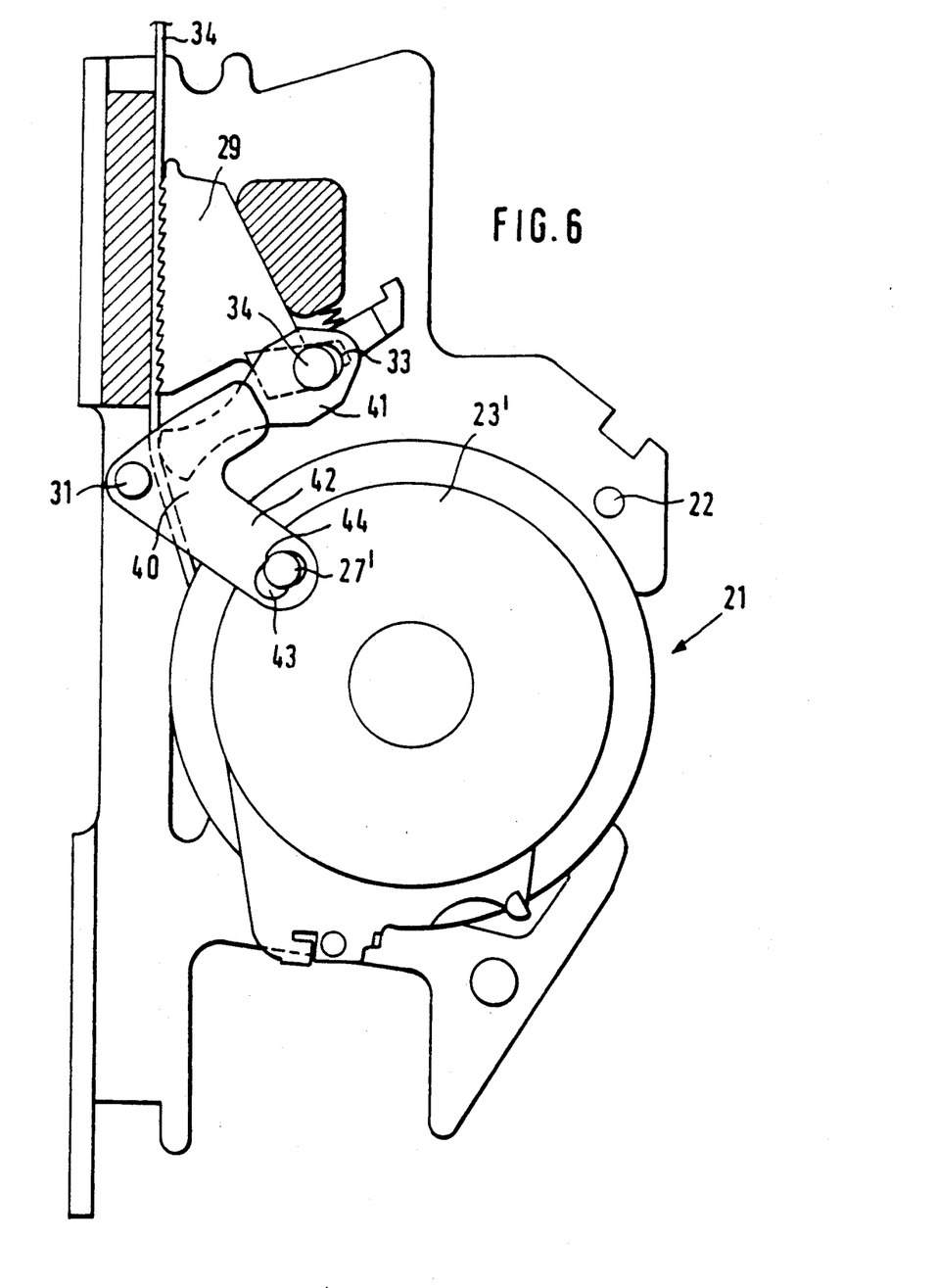
FIG. 6 is a side elevation showing a fourth embodiment of the belt clamping apparatus in accordance with the invention, in which the clamping wedge is movable by a bell-crank lever which is provided with a cam aperture.

In the embodiment shown in FIG. 6, the control lever 32 has been replaced by a bell-crank lever 40, which is pivoted to the housing on the pivot 31. The arm 41 thereof is linked to the clamping wedge 29 like the control lever 32. For that purpose the arm 41 has a slot 33, which receives the pin 34 that is connected to the clamping wedge 29. The second or other arm 42 of the bell-crank lever 40 is formed with a windowlike cam aperture 43 and with an upper cam 44. The actuating pin 27' extends into the cam aperture 43 and is secured to the control disk 23', which is pivoted to the housing at 22.

When the reel shaft has been coupled to the control disk 23' in the manner described in Published German Application 34 18 378 and the belt 24 is being extracted, the control disk 23' will be pivotally moved about the axis 22. As a result, the actuating pin will impart by means of the cam 44 such a pivotal movement to the bell-crank lever 40 that the clamping wedge being moved to its clamping position will be displaced in the direction of belt extraction at the velocity at which the belt 24 is being extracted or at a different velocity, which is adapted to the velocity at which the belt is being extracted.

Figure 7:
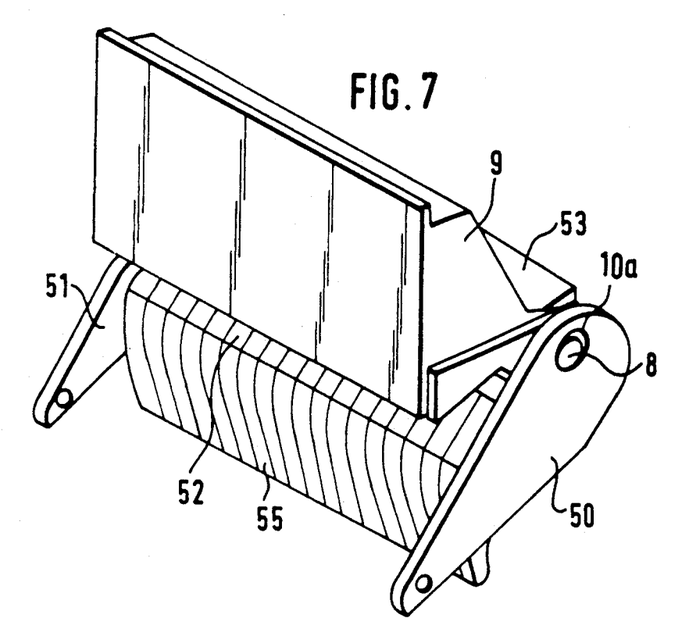
FIG. 7 is a perspective view showing the levers of the actuating member, which are interconnected by a crossbar provided with an extended belt guide, and the clamping wedge which is pivoted to that actuating member.

In accordance with FIG. 7 the levers 50, 51 are pivoted to the housing and are interconnected by the crossbar 52 to form a yoke. The levers constitute the pivoted actuating member.

The clamping wedge 9 constitutes one arm of a two-armed lever, the other arm of which constitutes a web 53, which, in a manner not shown in FIG. 7, supports the compression spring 14. Adjacent to the angled arms 9 and 53 the clamping wedge is provided on opposite sides with aligned pivot pins 8, which extend into slots 10a and 10b (not shown) of the levers 50, 51.

Figure 8:
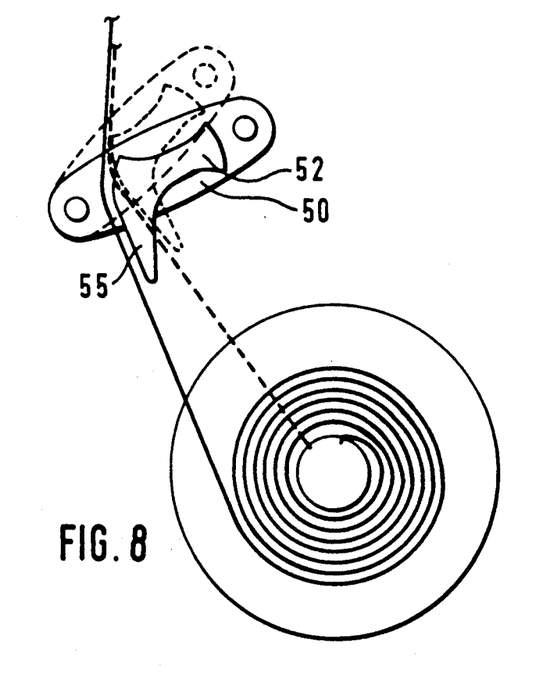
FIG. 8 is a diagrammatic side elevation showing the actuating member of FIG. 7.

The crossbar is provided with a belt guide 55, which is downwardly extended in tongue shape and where is rounded on its front side as shown in FIGS. 7 and 8.

Figure 9:
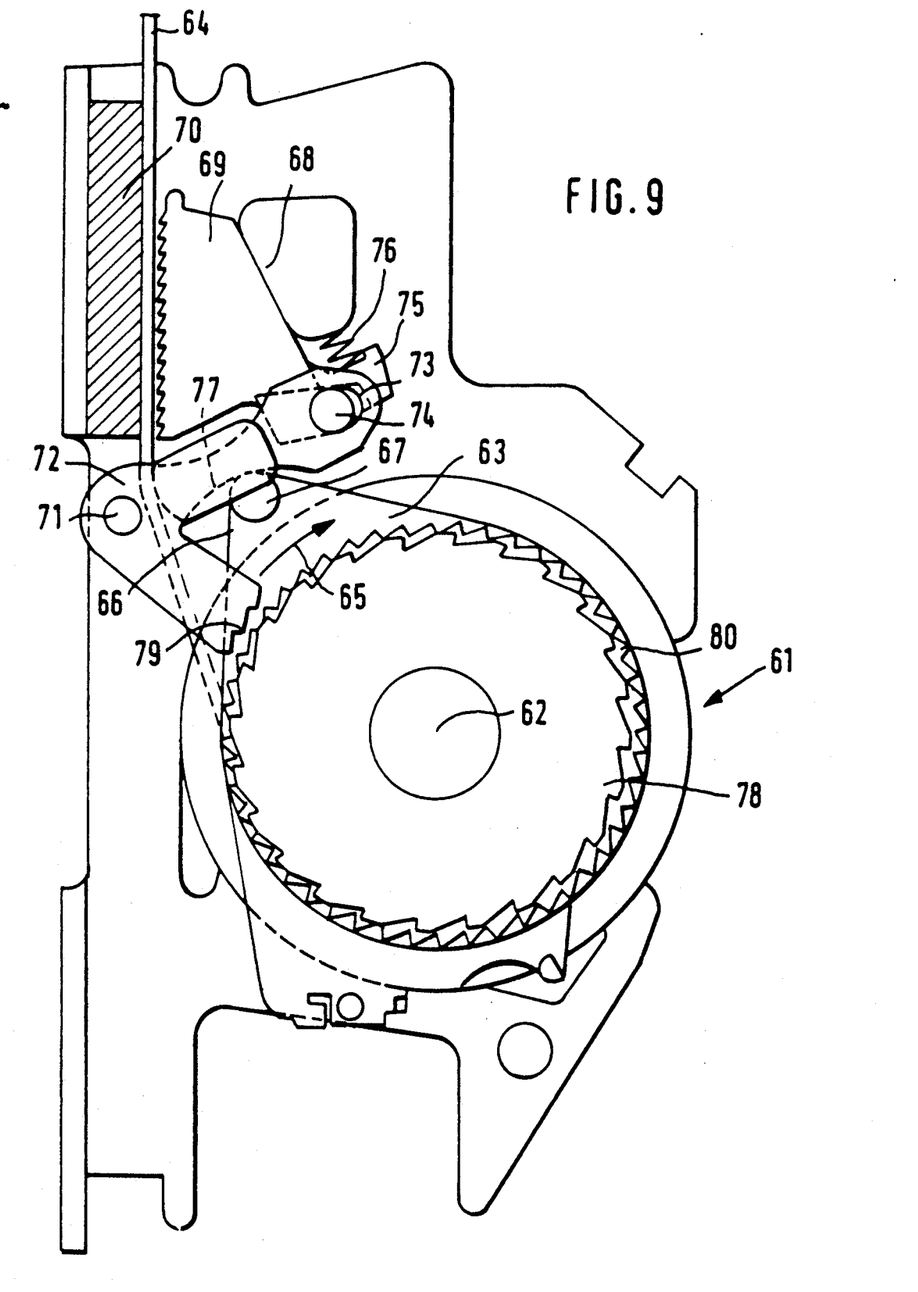
FIG. 9 is a side elevation showing a further embodiment of the belt clamping apparatus in accordance with the invention.

The belt clamping apparatus shown in FIG. 9 is also combined with a belt retractor. The belt retractor 61 is provided with a control disk 63, which is pivoted on the point at which the shaft 62 is movably mounted. When a vehicle-sensitive or belt-sensitive sensor, not shown here, has been activated the reel shaft is coupled to that control disk by a control wheel 78, which is fixedly connected to the shaft. Thereafter an extraction of the belt 64 will cause the control disk 63 to rotate in the direction indicated by the arrow 65.

The control disk 63 is provided with a luglike extension 66, which carries an actuating pin 67.

An oblique guide 68 for the clamping wedge 69 is disposed above the belt retractor 61 and fixed to the housing. The clamping surface of the clamping wedge 69 is provided with teeth and together with the back-pressure plate 70 defines a gap for the passage of the belt 64.

A bell-crank lever 72 is pivoted to the housing on the pivot 71 below the clamping wedge 69 and has at one end a slot 73, which receives a pin 74 that is connected to the clamping wedge 69. The clamping wedge 69 is provided with an abutment 75. A compression spring 76 is compressed between the abutment 75 and the oblique guide 68 and holds the clamping wedge 69 clear of the belt 64 when the acceleration sensors are not activated.

The bell-crank lever 72 is provided on its underside with a camming edge 77, which cooperates with the actuating pin 67. The other end of the bell-crank lever 72 is provided with teeth 79.

When a response of a sensor causes the control disk 63 to be coupled to the control wheel 78 and the shaft, the actuating pin 67 will rotate the bell-crank lever 72 about the pivot 71 so that the clamping wedge 69 is displaced upwardly. As soon as the teeth 79 of the bell-crank lever 72 mesh with the teeth 80 of a flange that is fixed to the shaft, the continued rotation of the reel shaft will cause the camming edge 77 of the bell-crank lever 72 to release the actuating pin 67 and the force that is required to move the wedge 69 to its clamping position will then directly be transmitted from the reel shaft to the clamping wedge without an interposition of the sensor pawls and the actuating pin 67.

Figure 10:
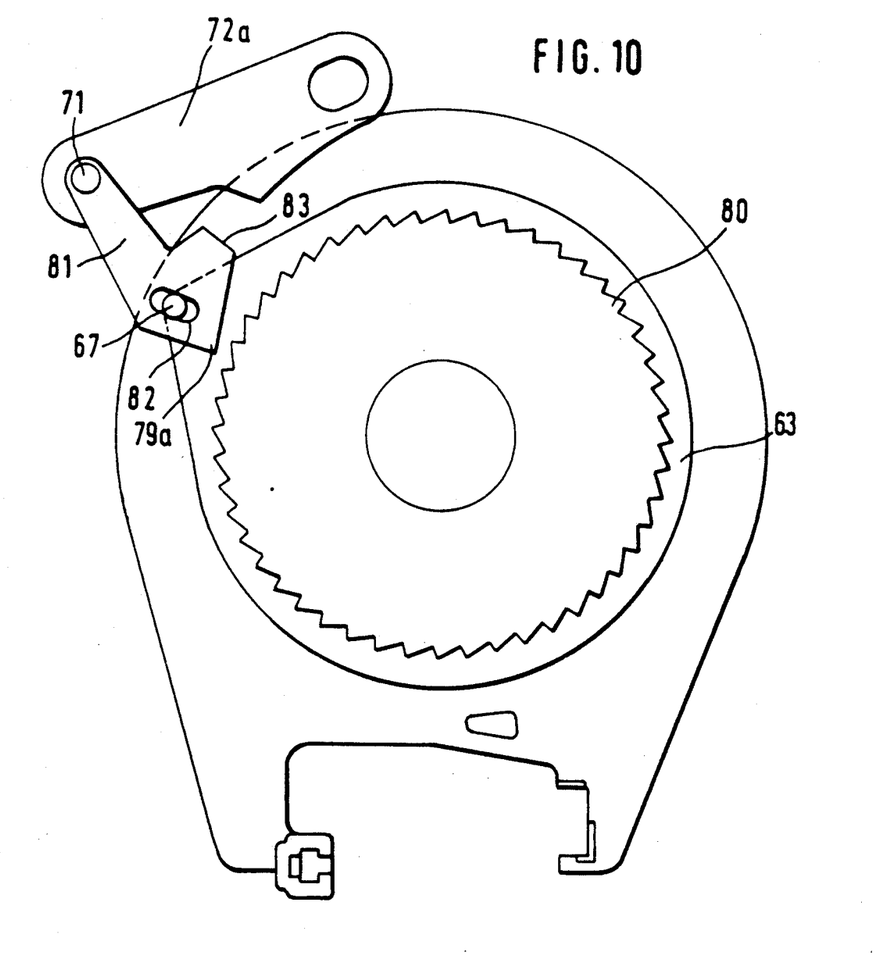
FIG. 10 is a diagrammatic side elevation showing the belt clamping apparatus in accordance with the invention provided with a separate preliminary control lever.

In the illustrative embodiment shown in FIG. 10 the bell-crank lever 72 has been replaced by a one-armed lever 72a, which is also pivoted at 71. A pilot lever 81 is also pivoted at 71. When an activation of a sensor causes the control disk 63 to rotate in a clockwise sense, the actuating pin 67 and the pawl of the activated sensor will have to take up only the force that is required to impart to the pilot lever 81 a pivotal movement to such an extent that the tooth 79a of the lever 81 meshes with the teeth 80 of the flange that is fixed to the shaft. In this embodiment the actuating pin 67 is guided in a slot 82 of the pilot lever. When the edge 83 of the pilot lever 81 bears on the one-armed lever 72a, the force will again directly be transmitted from the shaft via the teeth 80 and tooth 79a and the two levers 81 and 72a to the clamping wedge, not shown here, so that the latter performs a clamping movement.

Figure 11:
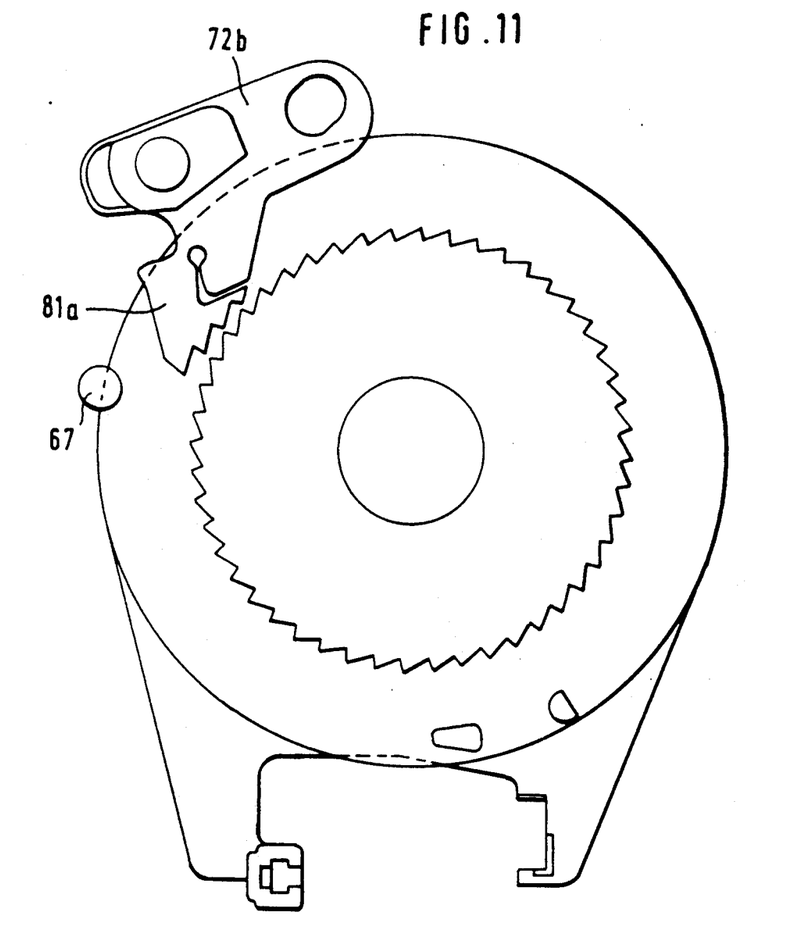
FIG. 11 is a diagrammatic side elevation showing the belt clamping apparatus in accordance with the invention provided with a preliminary control lever that has been molded on the control lever.

The illustrative embodiment shown in FIG. 11 comprises a bell-crank lever 72b, which is directly connected to a pilot lever 81a. That illustrative embodiment has the same mode of operation as that shown in FIG. 10 but the apparatus can be made at much lower cost than the apparatus in accordance with the preceding embodiment.

We claim:

1. A belt clamping apparatus for a seat belt system comprising a housing provided with a sliding surface and having located therein a belt retractor including a movable reel shaft having a belt wound thereon, a back-pressure plate attached to said housing and a clamping wedge provided with two arms, said clamping wedge sliding on said sliding surface and guided to move parallel to said back-pressure plate and which back-pressure plate together with said clamping wedge defines a gap for the passage of said belt, an actuating member displacing said clamping wedge to its clamping position, said actuating member being rotatably connected at one end to said housing and pivoted at its other end to said clamping wedge when said belt is being extracted, said actuating member in response to movement of said reel shaft imparting a translational movement to said clamping wedge, a spring element located between said clamping wedge and a stop fixed to the housing, the arms of said clamping wedge forming a two-armed lever, one arm constituting a spring abutment having said spring element associated therewith which holds said clamping wedge out of engagement with said sliding surface fixed to said housing.

2. A belt clamping apparatus according to claim 1, characterized in that the actuating member comprises two spaced apart levers, which are interconnected by a crossbar, which constitutes a stop, wherein one side of the clamping wedge in position of rest lies on that stop whereas its wedge in disengaged position lies on the stop.

3. A belt clamping apparatus according to claim 2, characterized in that the crossbar which constitutes the stop is formed with a curved surface on that side which faces the back-pressure plate and that curved surface is centered on the center of the articulated joint between the actuating member and the housing so that the belt moving over the curved surface will be guided approximately in the same plane in all positions of the actuating member.

4. A belt clamping apparatus according to claim 3, characterized in that the crossbar which constitutes the stop is provided with a belt guide, which is extended in the direction of the reel shaft.

5. A belt clamping apparatus according to claim 1, wherein the spring element has a component of force which is exerted in the same direction as the sliding surface fixed to the housing.

6. A belt clamping apparatus according to claim 1, wherein the clamping wedge has pins located thereon and the actuating member has slots therein having longitudinal center lines lying in a plane which, when said apparatus is at a position of rest, includes an angle of about 45° with respect to the sliding surface fixed to the housing said pins extending into said slots and connecting said clamping wedge and said actuating member to each other.

7. A belt clamping apparatus according to claim 1, wherein an articulated joint is disposed between the clamping wedge and the actuating member, said joint lying in a plane defined by a continuation of the sliding surface fixed to the housing.

8. A belt clamping apparatus according to claim 1 wherein there is an angle of 26 to 28 degrees between the sliding surface fixed to the housing and the back-pressure plate.

9. A belt clamping apparatus according to claim 1, wherein the reel shaft is moved relative to the housing when the extraction of the belt is continued after the reel shaft is locked, characterized in that the actuating member comprises a camming edge on a side facing the reel shaft said camming edge engaging the reel shaft as it is moved, the camming edge being formed such that throughout the clamping movement of the clamping wedge the velocity of the clamping wedge in the direction in which the belt is extracted is determined by the shape of the camming surface.

10. A belt clamping apparatus according to claim 1, wherein the reel shaft is coupled to a control disk having an actuating pin secured thereto, characterized in that the actuating member is provided with a camming edge, which is engaged by the actuating pin the actuating pin pushing the clamping wedge to its clamping position in response to movement of the reel shaft after locking thereof.

11. A belt clamping apparatus according to claim 1, wherein the reel shaft is coupled to a control disk having an actuating pin secured thereto and the actuating member comprises at least one bell-crank lever provided with two arms and which is pivoted to the housing at a fixed location in the region between said arms, one arm engaging the clamping wedge and the other arm being formed with a cam aperture defined by a cam, the lever lengths, the angle between the lever arms and the shape of said cam being selected so that said actuating pin bears on the cam and displaces the clamping wedge to its clamping position by a clamping movement at a velocity which is constant or variable with respect to the velocity at which the belt is extracted.

12. A belt clamping apparatus according to claim 11, wherein the actuating pin is arranged so that a line described thereby during the clamping operation will be bisected by a straight line connecting the axis of the reel shaft and the pivotal connection between the actuating member and the housing.

13. A belt clamping apparatus according to claim 1, characterized in that the actuating member comprises a bell-crank lever, which is pivoted adjacent to its arms to the housing at a fixed location, one arm is pivoted to the clamping wedge and the other arm is provided with a toothed portion, which mesh with a gear that is fixed to the shaft during the clamping movement.

14. A belt clamping apparatus according to claim 13, characterized in that said toothed portion comprises a pilot lever, which during the clamping movement meshes with the gear that is fixed to the shaft, and said pilot lever only thereafter operatively engages the actuating member.

15. A belt clamping apparatus according to claim 14, characterized in that the pilot lever and the actuating member are interconnected in such a manner that they are movable relative to each other.

16. A belt clamping apparatus according to claim 15, characterized in that the pilot lever and the actuating member are integral and preferably consist of plastic.

* * * * *